L. RASCH.
DEVICE FOR CLOSING THE SLITS OF PACKING RINGS.
APPLICATION FILED APR. 5, 1916.
1,332,952.
Patented Mar. 9, 1920.
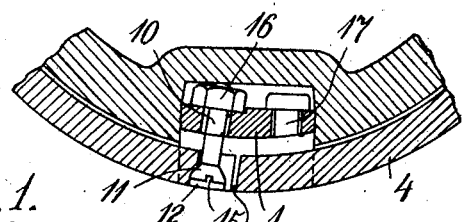
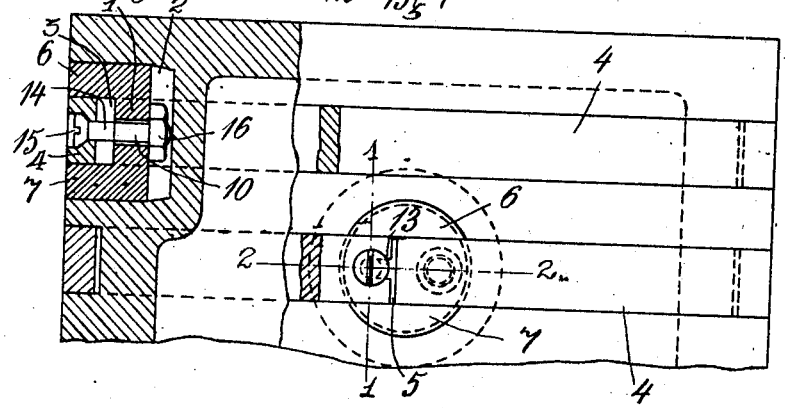
Inventor:
Ludvik Rasch.

UNITED STATES PATENT OFFICE.

LUDVIK RASCH, OF CHRISTIANIA, NORWAY.

DEVICE FOR CLOSING THE SLITS OF PACKING-RINGS.

1,332,952.   Specification of Letters Patent.   Patented Mar. 9, 1920.

Application filed April 5, 1916. Serial No. 89,222.

*To all whom it may concern:*

Be it known that I, LUDVIK RASCH, a subject of the King of Norway, residing in the city of Christiania, Norway, have invented certain new and useful Improvements in Devices for Closing the Slits of Packing-Rings, of which the following is a specification.

This invention relates to improvements in closures for packing ring slits, and more particularly to that kind of closure having a member, which may be spring-pressed or yielding and which is provided with portions located upon both sides of the ring and contacting with the cylinder wall to prevent access of the pressure medium to said slit.

One of the main features of the invention resides in a novel means for obtaining the spring action for keeping the closure member in contact with the cylinder wall or piston rod, this result being herein obtained by securing the closure member to the packing ring itself.

This and other features of the invention will best be understood from the following description, taken in connection with the accompanying drawings, of two illustrated embodiments of the invention, it being understood that the invention in its true scope is definitely set forth by the claims.

In the drawings:

Figure 1 shows the top portion of a piston with the closure member of one embodiment of my invention in front view and in section, on line 1—1;

Fig. 2 is a sectional view on line 2—2 of Fig. 1.

Referring to the figures, the closure member 1 is lodged in a recess or cavity 2 provided in the piston body, said member being provided with a groove 3 to receive the packing ring 4, thereby forming the closure parts 6 and 7 for closing the slit 5 at top and bottom.

In this embodiment of my invention the closure member is secured or attached to the packing ring by means of a threaded bolt 10, which is screwed into a correspondingly threaded aperture provided in the closure member 1. Said bolt is provided with a head 11, which is received in a recess 12, provided therefor in the packing ring 4, and said recess communicates with the slit 5 by means of a slot 13; the bolt 10 will preferably be turned down at 14 to enable it to be passed through the slot 13, when the head 11 is to be slipped into the recess 12.

The outer surfaces of the closure parts 6 and 7 of the closure member should contact with the cylinder wall, and consequently the closure member 1 must be adjusted in respect to the packing ring 4, in such manner that the outer surfaces of said closure parts 6 and 7 shall be flushed with the outer surface of the packing ring. For this purpose the head 11 of the bolt 10 will preferably be provided with a groove 15, to enable said bolt to be screwed more or less into the closure member 1, by means of a screw driver or suitable implement. This adjustment being effected, the packing ring 4 is disengaged from the bolt 10, the block 1 is removed from the recess and the nut 16 is screwed down or set tightly against the inner surface of the block 1, so as to insure that the bolt 10 shall retain its position, whereupon the parts are again put in place.

The block 1 is prepared as follows:

The recess 2 in the body of the piston is made slightly tapered at the bottom thereof, and the block 1 is also correspondingly tapered sufficiently to enable said block to be firmly fixed in the recess 2 by giving said block a blow with a hammer. As the block thus forms a fixed part of the body of the piston it can now be worked or finished off simultaneously with the piston, both as regards the outer surface as well as regards the forming of the groove for the packing ring. When the block has been formed and finished it is extracted from the recess 2 by screwing a bolt through the threaded aperture intended to receive the bolt 10, the end of the bolt acting against the bottom of the recess and forcing the member 1 from the latter. When, as in the present case, the connecting bolt 10 is to be located to one side of the center of the block 1, it is preferable to provide a second aperture, diametrically opposed to the first one, in said member 1, through which a second bolt may be inserted, to exert an even pressure on the block 1, in forcing the latter out of the recess 2, after said block has been finished. The second bore will preferably be normally closed by a bolt 17, as shown in Fig. 2, or a second bolt, similar to the bolt 10 may be provided for this purpose, and in such case the free end of the packing ring will be provided with a recess to receive the head of said bolt, but in that event the slot 13 will be extended to the slit 5 with the full width of the recess, so as to allow the end of the packing ring 4 to move freely as it wears.

My invention has this great advantage, among others, over similar devices heretofore used, namely that it is so connected to the packing ring, that it exerts the same pressure against the inner surface of the cylinder as does the packing ring, and consequently said closure member will not wear a groove in the cylinder wall, and scoring of the cylinder from this cause is thereby avoided.

It will be apparent that my invention is equally applicable to cylinder constructions in which the packing ring is mounted in the wall of the cylinder, instead of in the piston.

Claims.

1. The combination of a piston provided with an annular groove; a packing ring positioned in said groove and provided with a slit; a closure member provided with a slot to receive the slit portion of said packing ring and closing said slit at top and bottom; and means connecting said packing ring and closure member and having provision to permit movement of said packing ring relatively to said closure member in one direction, while preventing movement of said packing ring relatively to said closure member in the opposite direction.

2. The combination of a piston provided with an annular groove; a packing ring positioned in said groove and provided with a slit; a closure member provided with a slot to receive the slit portion of said packing ring and closing said slit at top and bottom; and means connecting a free end of said packing ring to said closure member and having provision to permit movement of said free end of the piston ring relatively to said closure member circumferentially of the piston.

3. The combination of a piston provided with an annular groove; a packing ring positioned in said groove and provided with a slit; a closure member provided with a slot to receive the slit portion of said packing ring and closing said slit at top and bottom, the bottom of the slot in said closure member being spaced from the inner face of said packing ring; and connecting means connecting said packing ring and closure member and having provision relatively to adjust the position of said packing ring and closure member transversely of the piston.

4. The combination of a piston provided with an annular groove; a packing ring positioned in said groove and provided with a slit; a closure member provided with a slot to receive the slit portion of the packing ring and closing said slit at top and bottom; connecting means connecting said packing ring and closure member; means relatively to adjust the position of said packing ring and closure member transversely of the piston to bring their outer surfaces into the same plane; and locking means to prevent relative movement of the outer surfaces of said piston ring and closure member out of said plane away from the center of the piston, while permitting relative movement of the outer surfaces of said piston ring and closure member inwardly toward the center of the piston.

5. The combination of a piston provided with an annular groove; a packing ring positioned in said groove and provided with a slit; a recess provided in the wall of said piston, said recess intersecting said groove; a closure member adapted to be positioned in said recess and provided with a slot to receive the slit portion of said packing ring and closing said slit at top and bottom; a bolt having screw threaded engagement with said closure member and a head at its other end; an opening in the piston ring adjacent the slit in the latter and embracing said bolt with a sliding fit; a recess in said piston ring communicating with said opening, to receive the head of said bolt; and a nut on the screw threaded end of the latter.

6. The combination of a piston provided with an annular groove; a packing ring positioned in said groove and provided with a slit; a recess provided in the wall of said piston, said recess intersecting said groove; a closure member adapted to be positioned in said recess and provided with a slot to receive the slit portion of said packing ring and closing said slit at top and bottom; a bolt having screw threaded engagement with said closure member and a head at its other end; an opening in the piston ring adjacent the slit in the latter and embracing said bolt with a sliding fit, said opening communicating with the slit of the piston ring; a recess in said piston ring communicating with said opening, to receive the head of said bolt; and a nut on the screw threaded end of the latter.

7. The combination of a piston provided with an annular groove; a packing ring positioned in said groove and provided with a slit; a recess provided in the wall of said piston, said recess intersecting said groove; a closure member adapted to be positioned in said recess and provided with a slot to receive the slit portion of said packing ring and closing said slit at top and bottom; a bolt having screw threaded engagement with said closure member and a head at its other end; an opening in the piston ring adjacent the slit in the latter and embracing said bolt with a sliding fit, said opening being extended longitudinally of the piston ring to permit relative movement of the latter and said bolt circumferentially of the piston; a recess in said piston ring communicating with said opening, to receive the head of said bolt; and a nut on the screw threaded end of the latter.

8. The combination of a piston provided with an annular groove; a packing ring within said groove and provided with a slit; a closure member provided with a slot to receive the slit-portion of said packing ring and closing the slit at top and bottom; and connecting means connecting said packing ring and closure member and having provision for relatively adjusting said packing ring and closure member, transversely of the piston.

9. The combination of a piston provided with an annular groove; a packing ring within said groove and provided with a slit; a closure member provided with a slot to receive said slit-portion of said packing ring and closing the slit at top and bottom; connecting means connecting said packing ring and closure member and having provision for relatively adjusting said packing ring and closure member transversely of the piston; and means to lock the piston ring against outward movement from adjusted position relatively to the closure member.

10. The combination of a piston provided with an annular groove; a packing ring positioned in said groove and provided with a slit; a closure member provided with a slot to receive the slit-portion of the packing ring and closing said slit at top and bottom; means connecting said closure member to said packing ring and comprising means relatively to adjust said closure member and packing ring to bring their outer surfaces into the same plane; and locking means coöperating with said adjusting means to prevent the outer surface of the piston ring from moving outwardly beyond the plane containing the outer surface of said closure member.

In testimony whereof I affix my signature in presence of two witnesses.

LUDVIK RASCH.

Witnesses:
N. G. TAUDBERG,
HEDVIG STEFFENS.